United States Patent [19]

Takeyama

[11] 4,316,684
[45] Feb. 23, 1982

[54] MACHINING UNIT FOR USE IN MACHINE TOOL

[75] Inventor: Kosei Takeyama, Mishima, Japan

[73] Assignee: Toshiba Kikai Kabushiki Kaisha, Tokyo, Japan

[21] Appl. No.: 134,667

[22] Filed: Mar. 27, 1980

[30] Foreign Application Priority Data

Mar. 30, 1979 [JP] Japan .................... 54-37830

[51] Int. Cl.³ .............................................. B23B 47/00
[52] U.S. Cl. .................................................. 408/236
[58] Field of Search ................................ 408/236, 237

[56] References Cited

U.S. PATENT DOCUMENTS

| 1,712,894 | 5/1929 | McMillan | 408/236 |
| 1,748,556 | 2/1930 | McKnight | 408/236 |
| 2,750,851 | 6/1956 | Berthiez | 408/237 |
| 3,276,329 | 10/1966 | Saliba | 408/237 |
| 3,823,644 | 7/1974 | Mello | 408/236 |
| 4,057,234 | 11/1977 | Brucher et al. | 408/236 |

Primary Examiner—Harrison L. Hinson
Attorney, Agent, or Firm—Koda and Androlia

[57] ABSTRACT

A machining unit for use in a machine tool comprises a slide base support mounted on a base of the machine tool, a slide base located above the slide base support, and a device slidably mounted on the slide base for working a workpiece. Link members are pivotably attached to the slide base support and the slide base to constitute a quadric link mechanism. The quadric link mechanism is operated by a hydraulic cylinder-piston assembly swingably secured to the slide base support. The machining unit may further comprise a member attached to the slide base support for positioning and supporting the slide base so as to maintain a predetermined inclination thereof with respect to the horizontal.

8 Claims, 2 Drawing Figures

MACHINING UNIT FOR USE IN MACHINE TOOL

BACKGROUND OF THE INVENTION

This invention relates to a machining unit to be assembled into a machine tool and capable of easily varying inclination of the machining unit with respect to a horizontal base of the machine tool.

Recently, in a workpiece machining field, cases where several kinds of workpieces should be worked by using a single machine tool are increasing and in these cases it often happens to form bores through the workpieces which are inclined in different directions with respect to the horizontal base of the workpiece. For this purpose, the machining unit mounted on the machine tool has to be inclined every time when different workpieces to be bored are fed so as to align the inclination of the machining unit with a desired inclination of a bore to be worked.

Actually, however, when similar, but not exactly the same, workpieces are to be worked, there are many cases where the center of the bores to be worked is positioned at substantially the same position, but the inclinations thereof are different from each other and the center about which the machining unit is inclined is often positioned near the surface of the workpiece or at the inside thereof. For this reason, it is impossible to provide simple hinge means at the center of the inclination of the unit for changing the inclination thereof and it is obliged to provide an additional circular guide with the same center as that of the inclination center mentioned above, and the machining unit is constructed to be slidable on the circular guide. This not only complicates the machining unit but also increases the size of the machine tool.

Therefore, in these days, the above described method is not widely utilized, and when it is required to form bores having different inclinations for the workpieces, the workpieces are inclined every time when different workpieces are worked or machining units having different inclinations are provided for respective working stations. However, in a case where a plurality of the machining units are to be used for working one workpiece to form bores at several points, it is impossible to incline the workpiece when it is required to change the inclination of only one bore to be worked by one machining unit and the others are not changed. In this case, another one working station is required therefor. This makes complicate and bulky the machining unit, i.e., machine tool.

SUMMARY OF THE INVENTION

Accordingly, an object of this invention is to provide an improved machining unit for use in a machine tool capable of easily varying the inclination of the machining unit.

Another object of this invention is to provide a machining unit including a quadric link mechanism which moves upwardly the machining unit for easily varying the inclination thereof.

Still another object of this invention is to provide a machining unit including positioning members for precisely positioning the machining unit and firmly supporting the same.

According to this invention there is provided a machining unit for use in a machine tool comprising a slide base support mounted on a base of the machine tool, a slide base located above the slide base support, a device slidably mounted on the slide base for working a workpiece, link members pivotably attached to the slide base support and the slide base so as to constitute a quadric link mechanism, and a hydraulic cylinder-piston assembly swingably attached to the slide base support for operating the quadric link mechanism thereby to move the slide base.

The machining unit may further comprise a member attached to the slide base support for positioning and supporting the slide base when the slide base is moved by the operation of the quadric link mechanism so as to maintain a predetermined inclination of the slide base with respect to the horizontal.

BRIEF DESCRIPTION OF THE DRAWINGS

In the accompanying drawings

DESCRIPTION OF THE PREFERRED EMBODIMENTS

Figure 1:
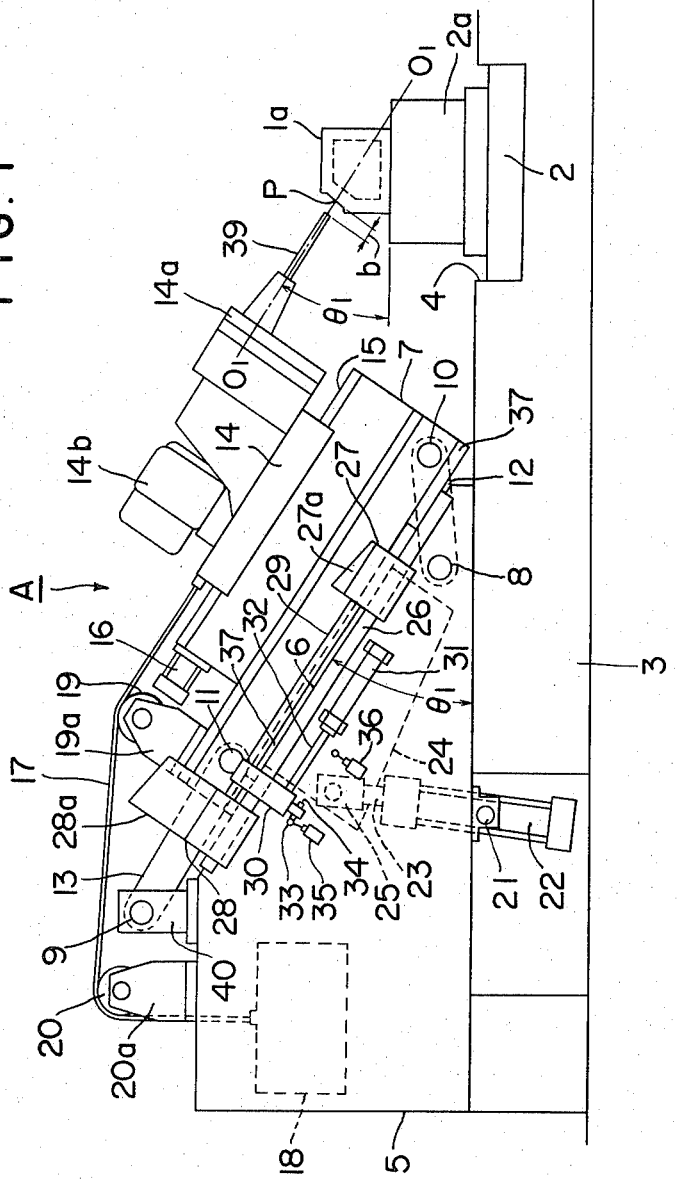
FIG. 1 is a front view showing a machine tool including a machining unit according to this invention before it is inclined.
Figure 2:
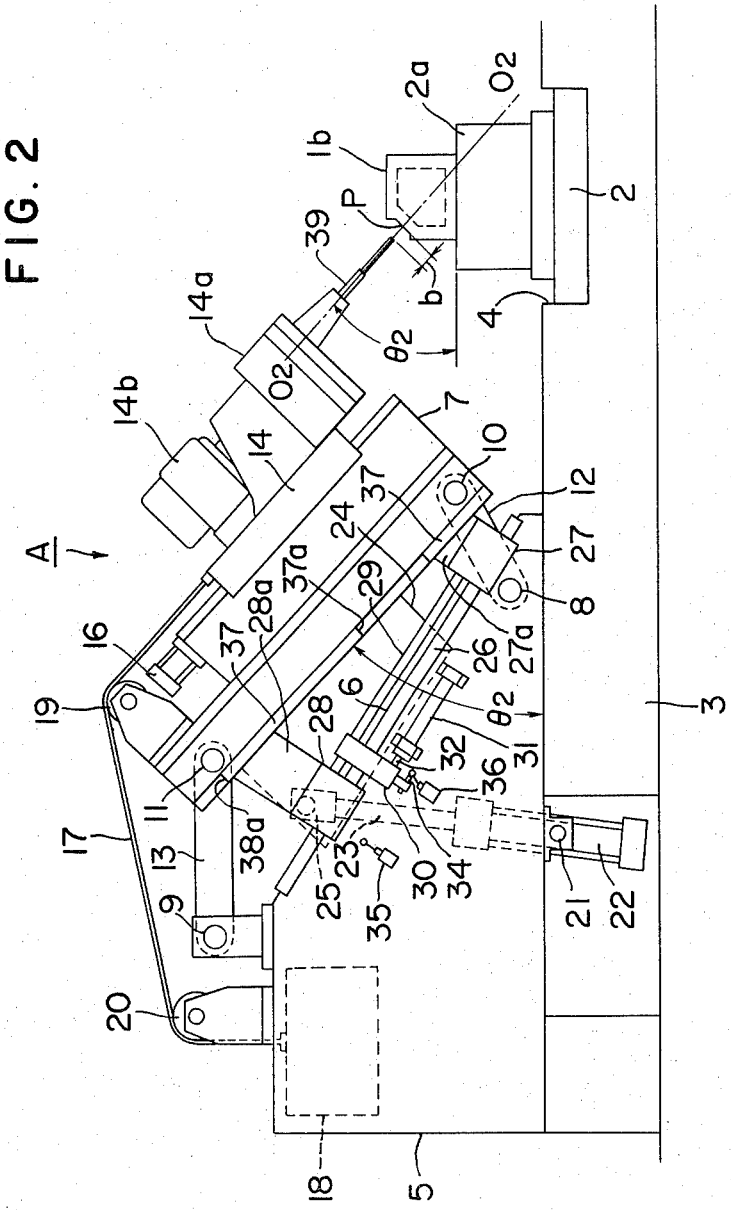
FIG. 2 is a front view showing the same machine tool as shown in FIG. 1, in which the machining unit is inclined upwardly from the position shown in FIG. 1.

Referring to FIGS. 1 and 2 showing a machine tool for working a workpiece, which comprises a base 3, and a machining unit A slidably mounted on the base 3. On the base 3, there is mounted a pallet 2 to be movable through a guide way 4 and to support a workpiece 1a (or 1b) through a support 2a in a predetermined position. The pallet 2 is moved away together with the workpiece after the workpiece has been worked.

The machining unit A comprises a slide base support 5 mounted on the base 3, a slide base 7 located above the support base 5, a quadric link mechanism to move the slide base 7, a hydraulic cylinder-piston assembly 22 for operating the link mechanism, a saddle 14 slidably mounted on a guide member 15 secured to the slide base 7, and a spindle motor 14b and a gang head 14a mounted on the saddle 14. A drilling or cutting tool 39 is detachably fixed to the gang head 14a and operated by the motor 14b. The saddle 14 is moved along the guide member 15 by suitable drive means 16 such as a hydraulic cylinder-piston assembly.

To prevent the saddle 14 from sliding down along the guide member 15, a balance weight 18 is disposed in the support base 5 and connected to the saddle 14 through a chain 17 supported by guide rollers 19 and 20 which are rotatably secured to the slide base 7 and the support base 5 through brackets 19a and 20a, respectively.

The quadric link mechanism is constituted by link members 12 and 13, the support base 5 and the slide base 7. The link member 12 is pivotably attached to the support base 5 and the slide base 7 through pins 8 and 10, and the link member 13 is pivotably attached to the slide base 7 through a pin 11 and to a bracket 40 mounted on the support base 5, through a pin 9.

The hydraulic cylinder-piston assembly 22 is swingably secured through a hinge 21 to the support base 5 and the front end of the piston rod 23 of the assembly 22 is pivotably connected through a pin 25 to a bracket 24 which is attached to the lower side of the slide base 7 and extends downwardly therefrom. Thus, when the hydraulic cylinder-piston assembly 22 operates, the slide base 7 is moved to an elevated position shown in FIG. 2 by the operation of the quadric link mechanism as shown in FIG. 2.

Guide bars 26 are arranged on both sides of the main support base 5 in parallel with the inclined support surface 6 thereof. Positioning members 27 and 28 are slidably engaged with the guide bar 26 and they are interconnected by a bar 29 which is operatively connected to the piston rod 32 of a hydraulic cylinder-piston assembly 31 through an arm 30 secured to the bar 29. The upper halves 27a and 28a of the respective positioning members 27 and 28 may be detachably secured to suitable means, not shown, to the lower halves so as to provide upper surfaces having predetermined inclinations. The arm 30 is provided with dogs 33 and 34 at suitable positions on the both sides of the arm 30 and known-type limit switches 35 and 36 are secured to the support base 5 and operatively connected to the dogs 33 and 34 so as to detect the fact that the positioning members 27 and 28 are shifted to the waiting or inclined operating positions as shown in FIG. 1 or FIG. 2, respectively. The limit switches 35 and 36 generate signals when the positioning members are shifted in their respective predetermined positions thereby to stop the supply or discharge of pressurized oil into or from the hydraulic cylinder-piston assembly 31.

When the cylinder-piston assembly 22 is not operated to raise the slide base 7 as shown in FIG. 1 in which the slide base 7 inclines at an angle of $\theta_1$ with respect to the horizontal upper surface of the base 3, the positioning members 27 and 28 are received in notches 37a and 38a (clearly shown in FIG. 2) and are not engaged with a flat plate 37 secured to the lower surface of the slide base 7. But when the assembly 22 is operated to move the link mechanism, the slide base 7 is raised and the positioning members 27 and 28 disengage from the respective notches 37a and 38a and slide down along the flat plate 37 thereby to support the slide base 7 at a predetermined inclination as shown in FIG. 2 in which the slide base 7 has an inclination of $\theta_2$ with respect to the horizontal upper surface of the base 3.

The machine tool including the machining unit A according to this invention operates as follows.

When it is required to form, for a workpiece 1a, a bore with a center line $O_1$-$O_1$ which is inclined by an angle of $\theta_1$ with respect to the horizontal bottom surface of the workpiece 1a as shown in FIG. 1, the positioning members 27 and 28 are received in the notches 37a and 37a, respectively. Under this condition, the hydraulic cylinder-piston assembly 22 is operated to bring back the piston rod 23 thereof, thus causing the bottom surface of the flat plate 37 to engage with the inclined upper surface 6 of the support base 5. The drive means 16 mounted on the slide base 7 is operated to shift the saddle 14 along the guide 15 to a position suitable for the successive machining work. The motor 14b is driven together with the drive means to perform a predetermined working sequence including the steps of fast feeding, drilling and fast withdrawal of the tool 39, for example a drill, fitted to the gang head 14a to work the workpiece 1a so as to form a bore having the inclination of $\theta_1$.

This working sequence is substantially identical to that performed by a usual machine tool such as a transfer machine, and the machining unit A comprising several elements described hereinabove has dimensions suitable for carrying out predetermined working operations to the workpiece 1a. With the machine tool shown in FIG. 1, the machining unit A is positioned at a waiting or starting position in which the front end of the tool 39 is apart by a distance b from a point P on the surface of the workpiece 1a at which a bore having an inclination of $\theta_1$ is to be formed. The point P is the center of the bore to be formed. The saddle of the machining unit A is quickly fed forwardly by a distance slightly smaller than the distance b, and the control of the machining unit A is then switched to carry out the feed drilling operation. Thereafter, the saddle 14 is quickly brought back to the starting position. These operations can be done by the operation of the drive means 16 and the motor 14b. Thus, bores are formed with a predetermined depth through workpieces 1a mounted on respective pallets 2 successively fed to face the machining unit A.

On the other hand, supposing that it is required to form, in a workpiece 1b, a bore having the center point P which is the same position as that shown in FIG. 1 and having an inclination of $\theta_2$ which is larger than $\theta_1$, the machining unit A is operated as follows.

The hydraulic cylinder-piston assembly 22 is operated so as to raise the piston rod 23 thereby to raise the slide base 7 through the bracket 24. The slide base 7 is upwardly moved and inclined with respect to the support base 5 because the links 12 and 13 are connected to the support and slide bases 5 and 7 so as to constitute a quadric link mechanism. The upward movement of the slide base 7 is stopped when it reaches a position having an inclination slightly larger than the predetermined inclination $\theta_2$. The hydraulic cylinder-piston assembly 31 is then operated to bring back the piston rod 32 thereof thereby to move the positioning members 27 and 28 out of the notches to the positions shown in FIG. 2. When the positioning members reach the predetermined positions, the dog 34 of the arm 30 abuts against the limit switch 36, which generates a signal to stop the operation of the cylinder-piston assembly 31. The piston rod 23 of the hydraulic cylinder-piston assembly 22 is then slightly brought back by the operation of the assembly 22 to slightly lower the slide base 7 so that the flat plate 37 secured to the bottom surface of the slide base 7 will come into contact with the upper inclined surfaces of the positioning members 27 and 28, respectively. After the flat plate, or the slide base 7, has engaged the positioning members, the assembly 22 is operated to bring back the piston rod 23 thereby to firmly maintain the engaging condition and the positional relationship between the slide base 7 and the support base 5 through positioning members.

When the machine tool has been operated to a position shown in FIG. 2 as described above, because the saddle 14 is in the same position as that shown in FIG. 1 with respect to the slide base 7, the front end of the tool 39 is positioned such that the center point P of a bore to be worked shown in FIG. 2 would coincide with the same position as the point P in FIG. 1 by preliminarily determining the lengths of the links 12 and 13 or the positions of the pins 8 and 9. This can easily be accomplished by mathematical calculation. After this operation, the saddle 14 is driven by the drive means 16 together with the motor 14b in the same manner as described in conjunction with FIG. 1 thereby to form a bore through the workpiece 1b and the center line $O_2$-$O_2$ of the bore inclines at a predetermined angle of $\theta_2$. Thus, the bore having a predetermined inclination $\theta_2$ and a desired depth can be formed by driving the machining unit A including the quadric link mechanism.

Although in the foregoing description, there is disclosed an example in which the machining unit A forms bores having different inclinations without changing the position of the center P of the bore to be worked, the position of the center P can be shifted by presetting the lengths of the link members 12 and 13 or the positions of the pins 8 and 9. The inclination of the upper portions of the positioning members 27 and 28 may be varied in accordance with the desired inclination of the machining unit A.

With the preferred embodiment of this invention described above, although the hydraulic cylinder-piston assembly 22 is used for operating the slide base 7, the assembly 22 can be exchanged with another drive mechanism such as an assembly of a motor and a feed screw. In addition, instead of the positioning members 27 and 28, a stopping member for limiting the pivotal movement of the quadric link mechanism may be used. Positioning pins inserted into the both sides of the slide base 7 through a supporting member for the support base 5 can also be used. Moreover, although the slide base 7 is caused to firmly engage the upper surfaces of the positioning members 27 and 28 by bringing back the piston rod 23 of the hydraulic cylinder-piston assembly 22, any other suitable drive means may be provided for the same purpose.

As described above, according to this invention there is provided a machine tool including a compact machining unit utilizing a quadric link mechanism, whereby the machining unit can easily be shifted to any position of a desired inclination from one position of different inclination.

I claim:

1. A machining unit for use in a machine tool comprising a slide base support mounted on a base of the machine tool, a slide base located above said slide base support, means slidably mounted on said slide base for working a workpiece, link members pivotably attached to said slide base and said slide base support so as to constitute a quadric link mechanism, and means swingably attached to said slide base support for operating said quadric link mechanism thereby to move said slide base from a first position wherein said slide base is at a first angle of inclination to a second position wherein said slide base is at a second angle of inclination.

2. The machining unit according to claim 1 which further comprises means attached to said slide base support for positioning and supporting said slide base when said slide base is moved by the operation of said quadric link mechanism so as to maintain a predetermined inclination of said slide base with respect to the horizontal.

3. The machining unit according to claim 2 wherein said slide base positioning and supporting means comprises a positioning member slidably mounted on a guide disposed along the inclined side surface of said slide base support and means for moving said member along said guide.

4. The machining unit according to claim 2 wherein said positioning and supporting member is received in a notch provided for the side bottom of said slide base when said slide base is not moved.

5. The machining unit according to claim 3 wherein said positioning and supporting member comprises two interconnected members mounted near the respective ends of said guide to be slidable along said guide.

6. The machining unit according to claim 3 wherein inclination of upper surface of said positioning member is made variable with respect to the horizontal.

7. The machining unit according to claim 1 wherein said link members are detachably secured to said slide base and said slide base support to be changeable in accordance with a desired inclination of said slide base.

8. The machining unit according to claims 1, 2, 3, 4, 5, 6 or 7 wherein lengths of the link members of said quadric link mechanism are predetermined so that the front end of said workpiece working means and the center of a bore to be formed through the workpiece have a constant positional relationship therebetween in the cases where said workpiece working means has an original inclination and where it has a desired inclination.

* * * * *